United States Patent [19]
Hansen

[11] Patent Number: 4,480,845
[45] Date of Patent: Nov. 6, 1984

[54] SIDE MOUNTED FUEL TANK ON A TRACTOR

[75] Inventor: Kenneth N. Hansen, Waukesha, Wis.

[73] Assignee: Allis-Chalmers Corp., Milwaukee, Wis.

[21] Appl. No.: 455,012

[22] Filed: Jan. 3, 1983

[51] Int. Cl.³ .................. B60K 15/02; B60R 3/00
[52] U.S. Cl. ........................... 280/5 A; 280/164 R
[58] Field of Search .............. 280/5 A, 5 H, 5 R, 163, 280/164 R; 180/900

[56] References Cited

U.S. PATENT DOCUMENTS

| 3,311,183 | 3/1967 | Phillips | 280/5 H |
| 3,667,563 | 6/1972 | Korb et al. | 280/5 A |
| 3,697,093 | 10/1972 | Cadiou | 280/5 A |
| 4,149,733 | 4/1979 | Grooss | 280/5 A |
| 4,174,117 | 11/1979 | Slosiarek | 280/163 |
| 4,232,874 | 11/1980 | Ystebo | 280/5 A |

Primary Examiner—John A. Pekar
Attorney, Agent, or Firm—Arthur L. Nelson

[57] ABSTRACT

A side mounted fuel tank for a tractor having reinforced ribbing around the tank, a base support for supporting the tank, and side wall retainer reinforcement to retain its shape. A step connected between the cantilever beam supports the base support which carries the tank.

16 Claims, 10 Drawing Figures

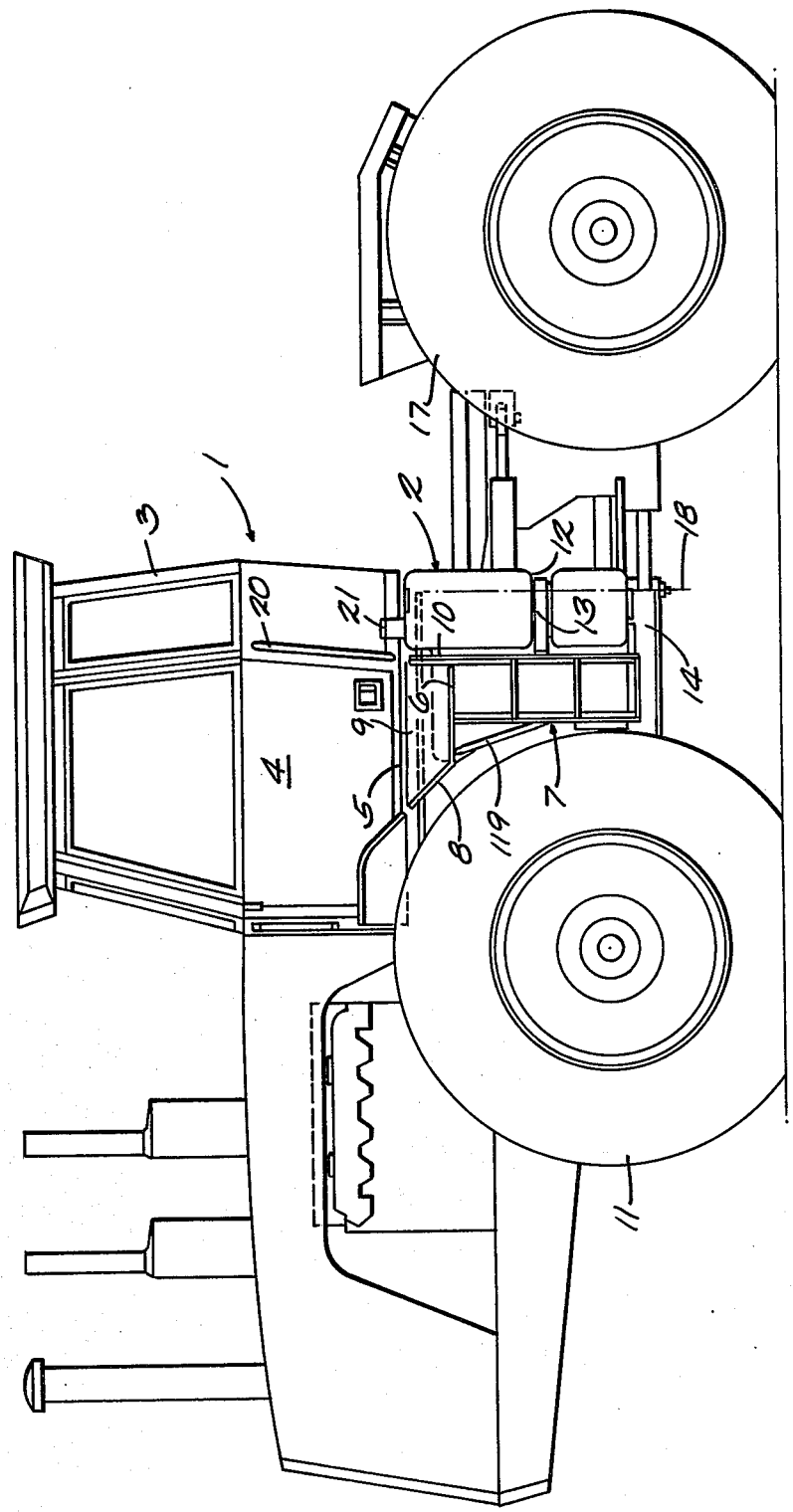

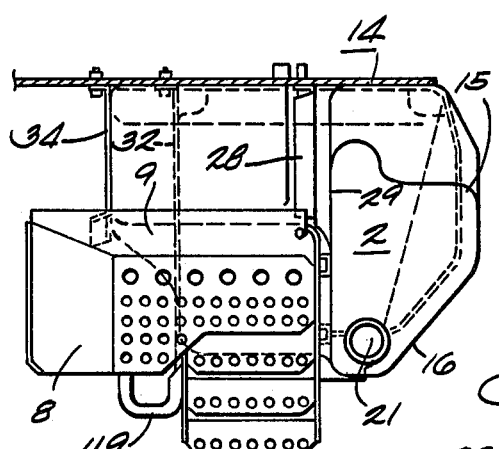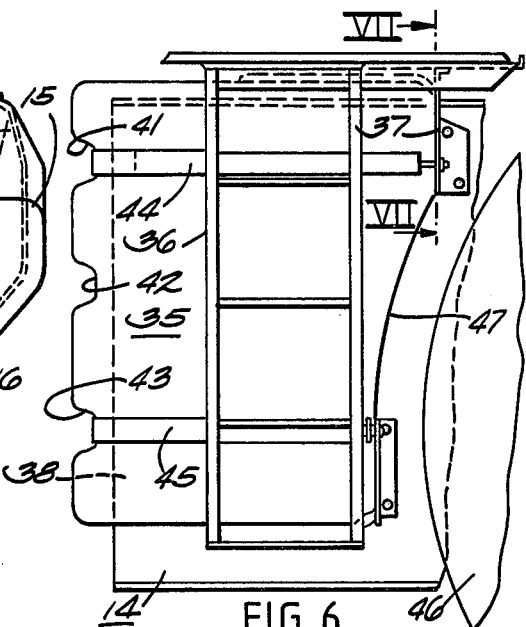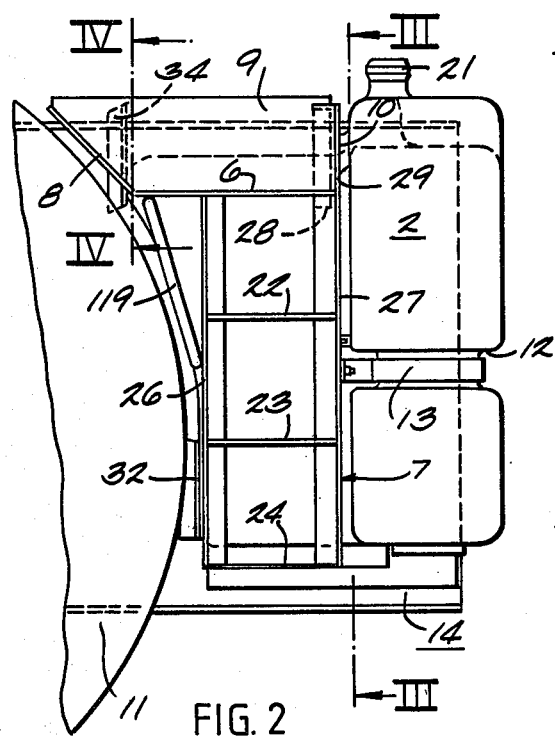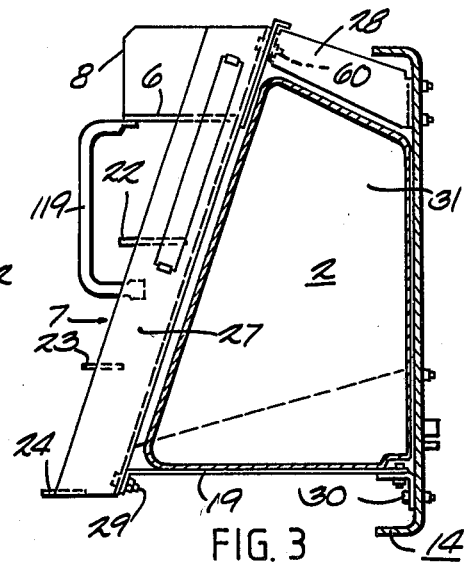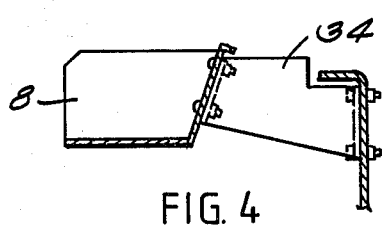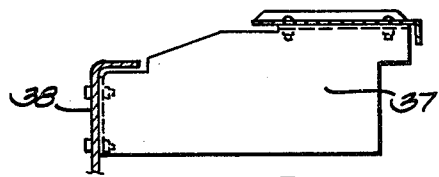

SIDE MOUNTED FUEL TANK ON A TRACTOR

This invention relates to a tractor fuel tank and more particularly to a side mounted fuel tank confined to a space defined by the vehicle chassis, the fore and aft wheels, and a step. The tank has reinforcing structure and supporting means for carrying a fuel tank and retaining the tank to a preformed shape.

Fuel tanks on tractors have been carried at various positions on the tractor. It has been common to carry the fuel tank over the engine since this provides gravity feed to the engine. However, there is sometimes a problem with vapor lock since the heat of the engine tends to vaporize the fuel. Another location is under the seat, but this location is competing for space requirements of such attachments as the hitch or components of the hydraulic system. Fenders have been used as a storage tank for fuel, however, they may become damaged since they are extending outwardly from the tractor and can bump into obstructions during normal operation of the tractor.

Metal fuel tanks have been popular and are quite durable, however, the cost may be objectionable and excessive vibrations have been known to cause failures. More recently the use of plastic or polyethylene material has been considered for fuel tanks. Because they are less rigid than metal their reliability has been good.

Accordingly, the applicant's invention provides for a fuel tank on the side of the tractor confined to a space that is defined by the vehicle chassis, a step suspended from a cantilever beam on the chassis and carrying a tank support. Preferably, this tank is adapted for use on four-wheel drive tractors in which the front and rear wheels are large and the limits of the tank fore and aft are limited by the wheel space. The tank also is positioned below the height of the vehicle platform and above a minimum clearance space for the vehicle. To provide efficient use of the space, the conventional retangular or circular tank is not used, but the tank is conformed to the limits of the space mentioned above and preferably is molded to this size to provide a maximum volume of fuel. The side walls of the tank are preferably formed to provide stiffness for the tank walls and reinforcing structure along with the stiffening structure causes the tank to hold its shape. The steps for the vehicle provide a suspension link for the tank support and a partial fender structure also provides a reinforcing structure for the tank. The tank is positioned adjacent the vehicle chassis which also provides a support and reinforcing structure for the tank. The vehicle step provides the suspension link between a cantilever beam extending from the chassis over the tank for support of the tank which is immediately under the tank. The upper portion of the step provides a protective structure which is flared to form a partial fender structure as well as the reinforcing structure for the vehicle tank.

It is an object of this invention to provide a side mounted fuel tank mounted between the two wheels on the side of the vehicle and supported by a cantilever beam, a step and a supporting base immediately under the fuel tank.

It is another object of this invention to provide a side mounted fuel tank preformed to the space between the front and rear wheels of the vehicle, the chassis, and a step in spaced relation to the chassis and the platform level at the operator station of the vehicle and the minimum clearance height underneath the tractor.

It is a further object of this invention to provide a side mounted fuel tank mounted on a base support, which is carried on a link defined by the step which in turn is carried on a cantilever beam extending over the tank. The tank is also confined by the wheels on the vehicle during their normal operation. The tank is mounted at a position lower than the platform of the vehicle operator station and above a minimum clearance required by the vehicle. The tank is provided with a rib structure to provide stiffness and reinforcing structure on the tank per se and straps received in peripheral recesses of the tank to further reinforce the tank and confine its position to the preformed structure of the tank.

The objects of this invention are accomplished by a vehicle fuel tank defined by the location of the front and rear wheels, the vehicle chassis and a step which provides access to the operator station. The step is suspended from a cantilever beam mounted on the vehicle chassis and extending over the tank to connect to the upper end of the step. The step extends downwardly to a support for the fuel tank. The support is immediately above the minimum clearance for the vehicle. The walls of the fuel tank are formed with the ribbed structure to provide stiffness and reinforced by straps extending around the periphery of the tank to maintain the tank in its fixed position and its preformed shape. The steps are flared at the top to form a partial fender which further protects the walls of the tank by partially enclosing the tank within the tank space. Two tanks are used with an inner connection between a fuel tank on either side of the vehicle to provide maximum fuel carrying capacity. A vertical ladder is used on the one side as an auxiliary step for access to the operator station. The vertical positioning of the ladder allows increased fuel capacity while a rib structure with reinforcing straps further stiffen the tank structure.

Referring to the drawings, the preferred embodiment of this invention is illustrated:

FIG. 1 illustrates a side elevation view of a tractor showing a side mounted fuel tank;

FIG. 2 is an enlarged view of the side mounted fuel tank on the tractor;

FIG. 3 is a cross-section view taken on line III—III of FIG. 2;

FIG. 4 is a cross-section view taken on line IV—IV of FIG. 2;

FIG. 5 is a plan view of the side mounted fuel tank shown in FIG. 2;

FIG. 6 is a side elevation view of the second fuel tank normally carried on the right-hand side of the vehicle;

FIG. 7 is a cross-section view taken on line VII—VII of FIG. 6;

Figure 9:
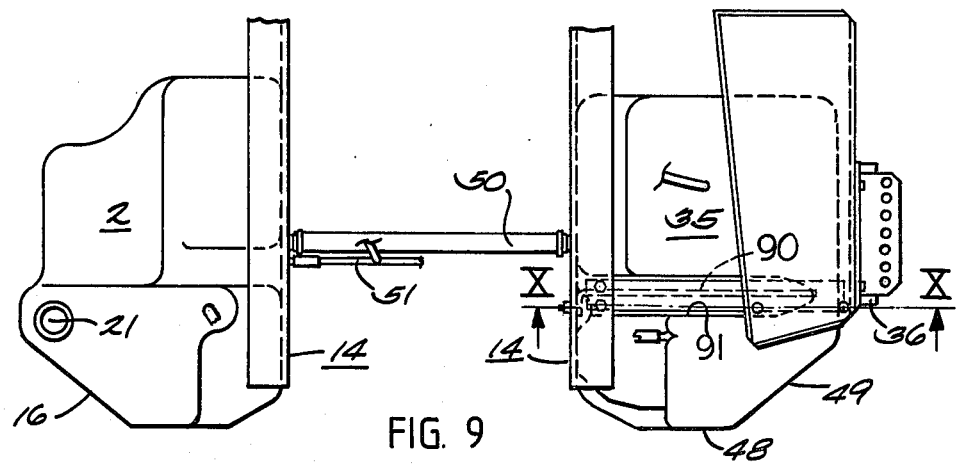
FIG. 9 is a plan view of the two fuel tanks shown in FIG. 8.

Referring to the drawings, the preferred embodiment of this invention is shown. FIG. 1 shows a side elevation view of the tractor 1 and a side mounted fuel tank 2 mounted on the left side of the tractor. The tractor 1 includes a cab 3 which defines the operator station 4. The platform 5 is mounted above the top foot rest 6 of the inclined stairway or step 7. A protective wall 8 extends transversely to the walls 9 and 10 to form a guard on the upper portion of the step structure or step 7. The wall 8 defines a partial fender for the wheel 11. The remaining foot rests for the step 7 extend downwardly alongside of the fuel tank to provide access for the operator to the operator station 4. The fuel tank 2 is formed with a recessed structure or horizontal recess 12 which receives a strap 13 fastened to the step 7 and also on the vehicle chassis 14. A portion of the rear surface 15 of the fuel tank 2 is partially cut away at 16 to form clearance and avoid interference from the rear wheel 17 as it articulates around the articulating axis 18 for the tractor. It is noted that the tractor is an articulated four-wheel drive tractor. The tank support 19 supports the bottom of the tank 2. A handrail 119 and a handrail 20 are provided to facilitate use of the steps in gaining access to the operator station 4. The door swings forwardly to open and allows use of both of the rails when using the step.

FIGS. 2, 3, 4 and 5 show the side mounted step which is mounted on the left side of the tractor. The fuel tank 2 is shown with a filler cap 21 extending upwardly alongside the vehicle cab for ease in fueling. There are four foot rests 6, 22, 23, 24 which are generally horizontal and spaced vertically from one another in sequence and which are connected as by welding at their longitudinally opposite ends to the rails 26, 27. The step 7 is an inclined stairway in confronting relation to a complimentary inclined side wall of the fuel tank 2. The section view of the fuel tank 2 shown in FIG. 3 illustrates the incline step 7 for ease in gaining access to the operator station. Although the sloped wall under the step does decrease fuel capacity of the tank, it does provide for easier access to the vehicle cab. The chassis 14 at the side of the tractor carries a cantilever beam 28 which extends through a recess 29 in the tank. The cantilever beam 28 extends upwardly to fasten to the step 7 by means of the bolts 60. The step 7 operates as a suspension link to carry the tank support 19. The step 7 is fastened by means of the bolts 29 to the support 19. The support 19 in turn is fastened by the bolts 30 to the vehicle chassis 14. The space 31 occupied in the fuel tank 2 is confined by the chassis 14, the step 7, the cantilever beam 28 and the support 19. The step 7 also carries a plate 32 at the lower portion of the step which operates partially as a fender as does the wall 8 at the upper portion of the step 7.

The curvature of the wheel 11 allows a larger foot rest 6 and wall 8 to be inclined. This provides roominess at the top of the step with ease and better balance for the operator in stepping to and from the cab. FIG. 4 shows a view of the upper portion of the step and the cantilever beam 34 for suspending the step and the tank support 19.

Figure 8:
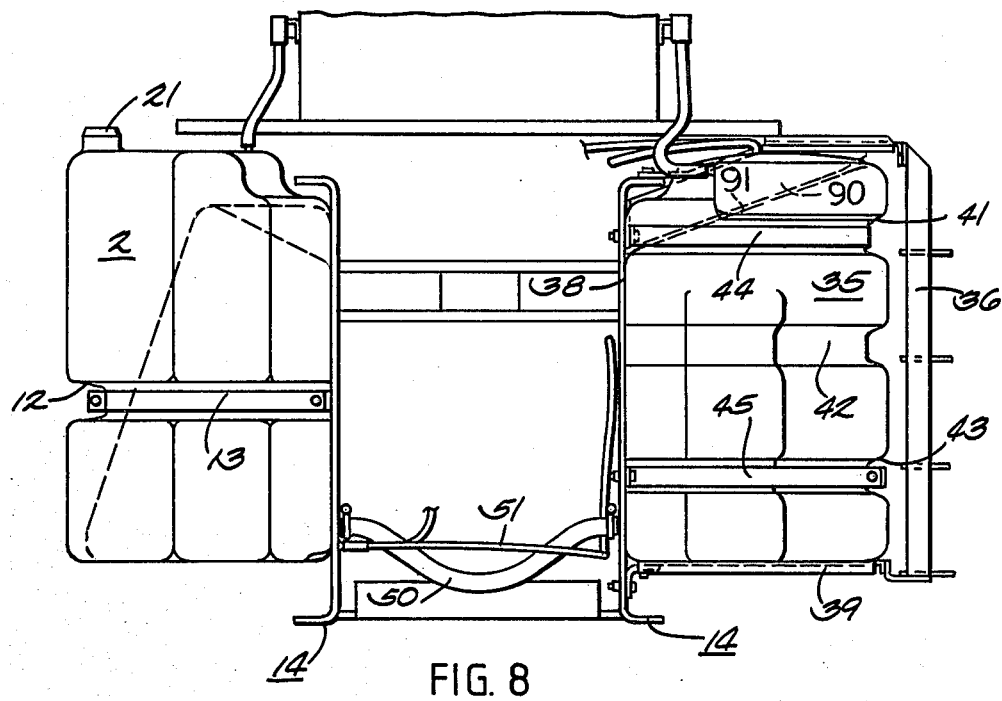
FIG. 8 is a rear view of the two fuel tanks mounted on the vehicle.
Figure 10:
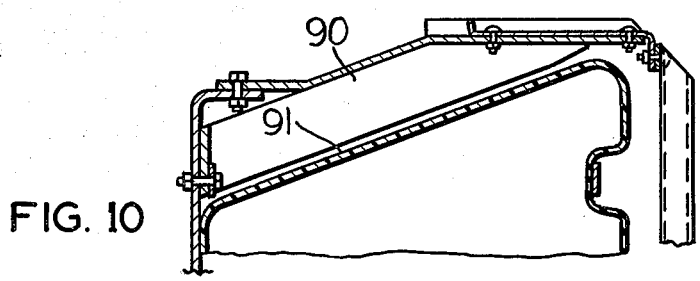
FIG. 10 is a cross-section view taken on line X—X of FIG. 9.

FIGS. 6, 8 and 9 show the side mounted fuel tank 35 mounted on the right-hand side of the vehicle. The ladder 36 is similarly suspended on cantilever beams 37 and 90 which in turn are partially carried on the bracket 38 of the vehicle chassis 14. The tank support 39 is also mounted on the bracket 38 of the chassis 14. Cantilever beam 37 is shown in FIG. 7 and cantilever beam 90 is shown in FIG. 10 in recess 91. The beams carry one side of the ladder 36 and are supported on the bracket 38. The tank 35 is formed with a plurality of peripheral recesses 41, 42, 43. A plurality of straps 44, 45 are positioned in the recesses 41, 43 to reinforce the tank. Straps 44, 45 are fastened between the ladder 36 and the bracket 38 on the vehicle chassis 14. The tank 35 is substantially larger than tank 2 since the ladder 36 is positioned vertically and is not inclined to the side of the vehicle. The tank 35 is positioned between the ladder 36 and the vehicle chassis 14 and positioned immediately below the level of the platform and above the minimum clearance level of the vehicle. A wheel 46 clears a concave wall 47 on the front side of the tank 35 and the rear wall 48 is cut away to form the clearance wall 49 so that the rear wheels clears the fuel tank when the vehicle is articulated to steer to the opposite side.

FIGS. 8 and 9 show the two fuel tanks mounted on the tractor. A connecting conduit 50 interconnects the two fuel tanks. The fuel line 51 is connected to the fuel tank 2 and adapted for connection to the fuel pump. The fuel tanks are mounted on opposing sides of the vehicle and are mounted essentially at the same level on the opposite sides of the vehicle.

The tanks are mounted in a position to occupy space not normally required by other equipment of the vehicle. The tanks may be molded to fill an irregular space and to provide maximum fuel capacity. A polyethylene material adapts itself well to this type of process. The tank is lightweight and can be protected by the structure around the tank such as the step, partial fenders, the chassis and the supporting structure underneath the tank. The tanks are at a level to facilitate refueling and which may be done from the ground or while standing on the step.

The embodiments of the invention in which an exclusive property or privilege is claimed are defined as follows:

1. A fuel tank means on a vehicle comprising, a vehicle chassis, a fuel tank, a fuel tank rest for supporting the base of said fuel tank, a cantilever beam extending from said chassis over said fuel tank, a step suspended from said cantilever beam supporting said fuel tank rest and including a plurality of vertically spaced foot rests providing access to the vehicle operator station, a fuel tank reinforcing means confining said fuel tank to a predetermined shape and location, means defining a foot rest on the top of said step of larger size than preceding foot rests on said step, and a protective wall flaring outwardly from said large foot rest defining a partial fender adjacent a rotating wheel.

2. A fuel tank means on a vehicle as set forth in claim 1 wherein, said tank includes means contouring said tank for clearance from a rotating wheel adjacent said fuel tank.

3. A fuel tank means on a vehicle as set forth in claim 1 wherein, said reinforcing means includes reinforcing peripheral ribs on said fuel tank for retaining the shape of said fuel tank.

4. A fuel tank means on a vehicle as set forth in claim 1 including, means defining a partial fender on said tank rest at the base of said fuel tank adapted for shielding said fuel tank from an adjacent rotating wheel.

5. A fuel tank means on a vehicle as set forth in claim 1 including, handrails adjacent said step to facilitate use of said step.

6. A fuel tank means on a vehicle as set forth in claim 1 including, means defining a recess in the top of said fuel tank adapted for receiving said cantilever beam extending from said chassis to said step.

7. A fuel tank means on a vehicle as set forth in claim 1 wherein, said reinforcing means defines reinforcing ribs on the periphery of said fuel tank, at least one strap extending from said chassis to said step to reinforce said reinforcing ribs and maintain the shape of said fuel tank.

8. A fuel tank means on a vehicle as set forth in claim 1 wherein, said step defines a vertical ladder having a plurality of foot rests.

9. A fuel tank means on a vehicle as set forth in claim 1 wherein, said fuel tank consists of a polyethylene material.

10. A fuel tank means on a vehicle as set forth in claim 1 including, means defining a recess in said fuel tank receiving said step and defining an inclined position for said step relative to said vehicle chassis.

11. A fuel tank means on a vehicle comprising, a vehicle chassis, a fuel tank, a horizontal fuel tank rest mounted on said vehicle chassis supporting the bottom of said fuel tank, a cantilever beam mounted on said chassis and extending over the said fuel tank, a suspension link defining a step suspended from said cantilever beam and supporting said fuel tank rest, at least one horizontal recess in the periphery of said fuel tank and a strap in said recess operative to reinforce and retain the shape of said fuel tank and to hold the latter in its installed position on said vehicle.

12. A fuel tank means on a vehicle as set forth in claim 11 wherein, a plurality of horizontal recesses are formed on said fuel tank in vertically spaced relation to one another to present a ribbed construction serving to reinforcement and retain the shape of said fuel tank.

13. A fuel tank means on a vehicle as set forth in claim 11 wherein said step includes, a plurality of foot rests.

14. A fuel tank means on a vehicle as set forth in claim 11 wherein said step is an inclined stairway and said fuel tank includes a recess receiving said stairway and further comprising a handrail on said stairway facilitating use of said stairway.

15. A fuel tank means on a vehicle as set forth in claim 10 including, means defining a clearance contour on said tank for allowing rotation of a front wheel, means defining a clearance contour of the other side of said fuel tank adapted for allowing clearance for rotation of a rear wheel.

16. A fuel tank means on a vehicle as set forth in claim 11 including, contour means on the front and rear of said fuel tank adapted for allowing wheels to rotate without interference with said fuel tank.

* * * * *